United States Patent [19]

Kitamura

[11] Patent Number: 4,511,191
[45] Date of Patent: Apr. 16, 1985

[54] ANTICREEP DEVICE FOR ANNULAR MEMBER

[75] Inventor: Masayuki Kitamura, Toyonaka, Japan

[73] Assignee: Koyo Seike Company Limited, Osaka, Japan

[21] Appl. No.: 580,453

[22] Filed: Feb. 14, 1984

[51] Int. Cl.³ ............................................. F16C 27/06
[52] U.S. Cl. ............................ 384/536; 308/DIG. 11; 384/539
[58] Field of Search .......... 308/184 R, 184 A, 207 R, 308/184 A, DIG. 11, 216, 193, 236

[56] References Cited

U.S. PATENT DOCUMENTS

| | | | |
|---|---|---|---|
| 2,036,978 | 4/1936 | Anderson | 308/DIG. 11 |
| 3,669,519 | 6/1972 | Takahashi et al. | 308/236 |
| 4,084,861 | 4/1978 | Greenberg et al. | 308/184 R |
| 4,317,602 | 3/1982 | Orain | 308/DIG. 11 |
| 4,403,812 | 9/1983 | Stephan | 308/184 R |

OTHER PUBLICATIONS

Published Japanese Application SHO 56-14219, Feb. 6, 1981.

Primary Examiner—Lenard A. Footland
Attorney, Agent, or Firm—Mason, Fenwick & Lawrence

[57] ABSTRACT

A device for preventing creep of the outer ring of an antifriction bearing relative to the housing supporting the outer ring. The bearing outer ring has a circumferential groove formed in its outer periphery eccentrically thereof and having fitted therein a bandlike resilient ring which has a curved protruding portion larger than the depth of the groove. In the vicinity of the protruding portion, the resilient ring has its opposite end portions lapped over each other within the groove. When the outer ring acts to creep within the housing, the shallow groove portion of the groove approaches the protruding portion and lapped end portions of the ring, causing the end portions to act as a wedge between the housing and the outer ring to stop the creep.

8 Claims, 10 Drawing Figures

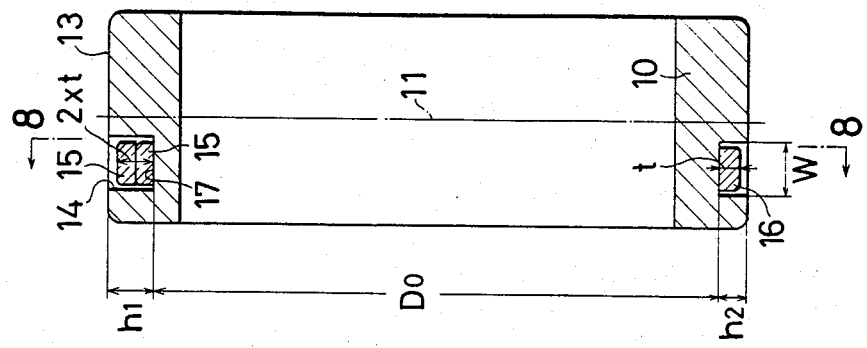
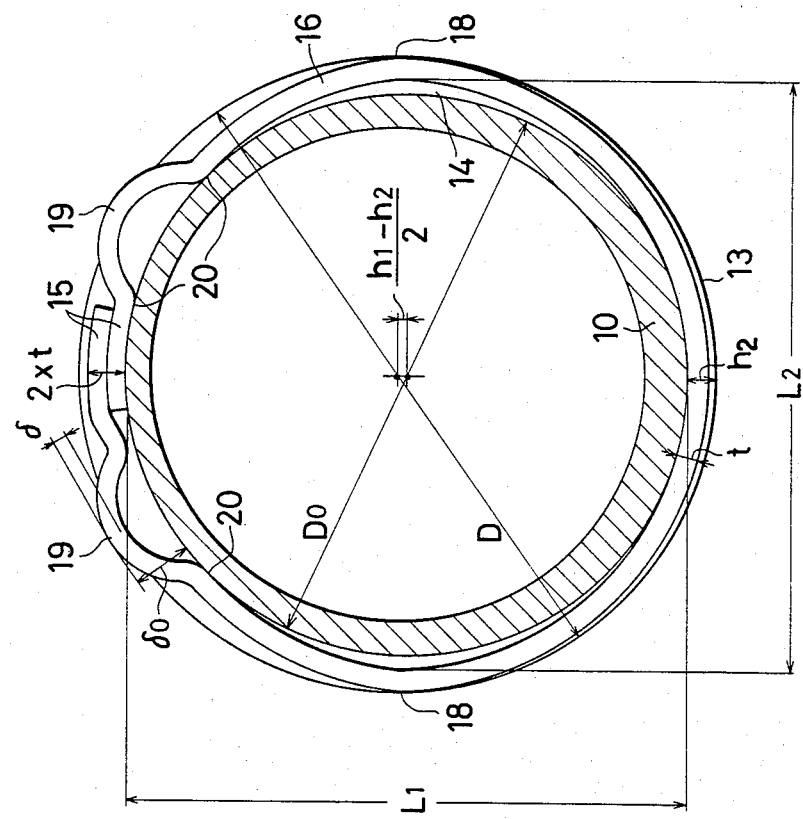

ANTICREEP DEVICE FOR ANNULAR MEMBER

BACKGROUND OF THE INVENTION

The present invention relates to an anticreep device for annular members, and more particularly to a device for use in an antifriction bearing for preventing the creep of the outer ring relative to the housing supporting the outer ring or the creep of the inner ring relative to the shaft supporting the inner ring.

With apparatus incorporating antifriction bearings, the inner ring or outer ring of the bearing is likely to creep depending on the mode of installation of the bearing and the material or structure of the housing or shaft, or owing to vibration or an increase in the fitting clearance due to the rise of temperature during use, resulting in seriously impaired bearing performance or marked wear on the fitting surface to shorten the life of the bearing as well as of the apparatus.

While various means have heretofore been developed for preventing such objectionable creep, many of them require a special groove or cutout in the bearing, housing or shaft, thus necessitating cumbersome procedures for machining the bearing or support member and for installing the bearing in apparatus.

These conventional devices include an anticreep assembly of relatively simple construction as disclosed, for example, in U.S. Pat. No. 3,669,519.

The assembly includes a resilient ring in engagement with a housing and engaging in a peripheral groove formed in the outer ring of a bearing. When the assembly is used under conditions involving vibration or varying loads, abrasion occurs at the portions where expanded arched portions of the resilient ring are in pressing contact with the housing, resulting in a reduced pressing contact force. Furthermore, the resilient ring is liable to creep relative to the grooved portion or to the housing, such that the anticreep assembly is not satisfactorily serviceable at locations where creeping poses a serious problem.

The low resistance of the conventional device to creep is thought attributable to the structure adapted to prevent creep by the pressing contact force which is available only by the elastic deformation (bending stress) of the resilient ring.

SUMMARY OF THE INVENTION

An object of the present invention is to overcome the foregoing drawbacks of conventional anticreep devices and to provide an anticreep device for annular members which is outstanding in anticreep properties and which is easy to assemble without necessitating a special machining procedure for annular member support members such as a housing and shaft.

The present invention provides an anticreep device comprising an annular member fittable in a bore of a support member and having a circumferential groove formed in its outer periphery eccentrically thereof and including a deep groove portion and a shallow groove portion, and a resilient ring fittable in the circumferential groove and having a protrudiing portion of a height of projection projectable from the deep groove portion toward the inner periphery of the support member defining the bore and opposite end portions fittable one over the other within the circumferential groove at a position adjacent to the protruding portion to provide a combined thickness larger than the depth of the shallow groove portion.

According to the present invention, the protruding portion and opposite end portions of the resilient ring are fitted in the deep groove portion of the circumferential groove of the annular member, while the other portion of the resilient ring is fitted in the shallow groove portion, and the assembly is inserted into the bore of the support member for use.

The advantages of the invention and features of modified embodiments of the invention will become apparent from the following detailed description.

BRIEF DESCRIPTION OF THE DRAWINGS

FIG. 8 is a front view in vertical section taken along the line VIII—VIII in FIG. 9 and showing a modified embodiment of the invention;

FIG. 9 is a side elevation in vertical section showing the device of FIG. 8.

DESCRIPTION OF THE PREFERRED EMBODIMENTS

Figure 4:
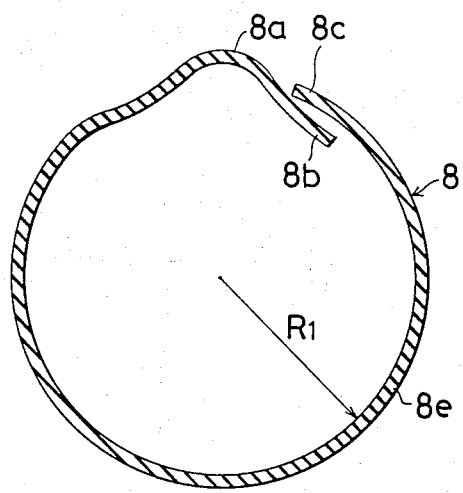
FIG. 4 is a front view in vertical section showing a resilient ring.

FIGS. 1 to 4 show a first embodiment of the present invention for preventing creep of the outer ring 6 of an antifriction bearing 5 relative to a housing 2 supporting the outer ring. The antifriction bearing 5 includes a multiplicity of rolling members 1 held in a radial arrangement between the outer ring 6 and an inner ring 9 by a retainer 4. According to the present invention, a circumferential groove 7 is formed in the outer periphery of the outer ring 6 eccentrically thereof over the entire circumference. On the other hand, a resilient metal ring 8 is adapted to fit in the circumferential groove 7. As seen in FIG. 4, the resilient ring 8 has a protruding portion 8a projecting outward radially thereof and one end 8c fittable over the other end 8c thereof at a location along its circumference.

The circumferential groove 7 is formed in the outer periphery of the outer ring 6 opposite to the race 6a thereof, at one side of the center of the periphery, so that the groove 7 provided will not impair the mechanical strength of the outer ring 6. The circumferential groove 7 has a width W which is slightly larger than the width of the resilient ring 8 so as to render the ring 8 fittable into the groove 7 easily. The groove 7 has a deep groove portion 7a and a shallow groove portion 7b, which are given depths h1 and h2, respectively, by positioning the center of the groove 7 at a distance of (h1−h2)/2 from the center of the outer ring 6.

The resilient ring 8 is made of a metal strip having a thickness t which is slightly smaller than the depth h2 of the shallow groove portion 7b of the groove 7. The ring 8 is fitted in the circumferential groove 7, with the protruding portion 8a positioned in the deep groove portion 7a. The resilient ring 8 is made annular so as not to project from the shallow groove portion 7b of the groove 7. The degree of projection of the protruding portion 8a is so determined that the portion 8a will project from the deep groove portion 7a of the groove 7 by a specified dimension.

The lapping joint 8d at opposite ends 8b, 8c of the ring 8 is positioned adjacent the protruding portion 8a at a short distance therefrom and is located close to the deep groove portion 7a and at a sufficient distance away from the shallow groove portion 7b. The radial thickness H of the lapping joint 8d is larger than the depth h2 of the shallow groove portion 7b. On the other hand, at locations close to the deep groove portion 7a, the groove 7 has a depth permitting the lapping joint 8d to be positioned completely within the groove 7. Of the two end portions 8b and 8c forming the lapping joint 8d, the ring end portion 8b closer to the protruding portion 8a is disposed on the bottom of the groove 7, with the other ring end portion 8c lapping over the portion 8b.

The portion of the resilient ring 8 other than the protruding portion 8a and the lapping joint 8d is a circular arc portion 8e having an inside diameter R1 matching the diameter of the bottom of the circumferential groove 7, such that when fitted in the groove 7, the circular arc portion 8e can be in resilient contact with the bottom surface of the groove 7.

The anticreep device operates in the following manner.

Figure 1:
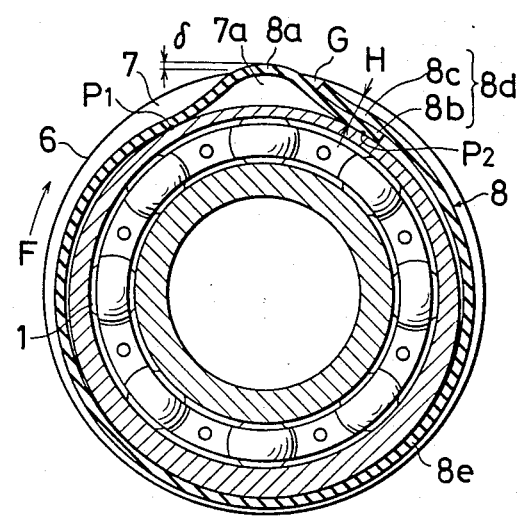
FIG. 1 is a front view in vertical section taken along the line I—I in FIG. 2 and showing an embodiment of the present invention.
Figure 2:
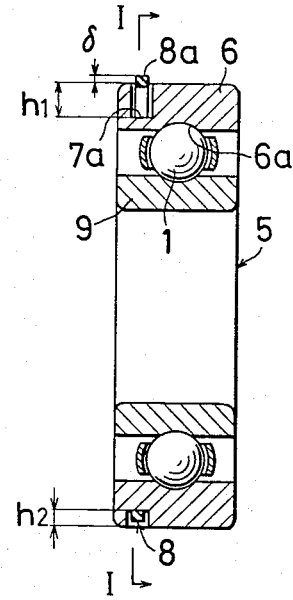
FIG. 2 is a side elevation in vertical section showing the device of FIG. 1.
Figure 3:
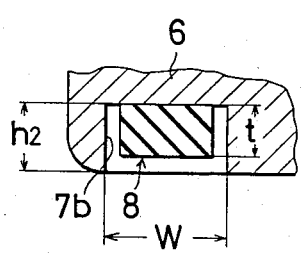
FIG. 3 is a fragmentary enlarged view in section showing the same.

The resilient ring 8 fitting in the circumferential groove 7 of the outer ring 6 has its protruding portion 8a compressed and deformed by the interference (indicated at $\delta$ in FIGS. 1 and 2) of the inner periphery 3 of the housing 2 supporting the outer ring 6 fitted therein, whereby opposite ends P1 and P2 of the protruding portion 8a are pressed into contact with the bottom surface of the groove 7 as shown in FIG. 1. On the other hand, the circular arc portion 8e, as supported at opposite ends P1 and P2 of the protruding portion 8a, is bulged radially outward into pressing contact with the inner periphery 3 of the housing 2. Moreover, the ring end portion 8b positioned at the groove bottom and forming the lapping joint 8d forces the other ring end portion 8c into pressing contact with the inner periphery 3 of the housing. While the protruding portion 8c, the ring end portion 8b at the groove bottom and the housing inner periphery 3 define a space G, the ring end 8c adjacent the housing is forced as a wedge toward the smaller portion of the space G near the protruding portion 8a by the pressure resulting from the compression and deformation of the protruding portion 8a. Thus, a major portion of the resilient ring 8 is pressed into contact with the inner periphery 3 of the housing, whereby the ring 8 is rigidly held to the housing 2.

Figure 5:
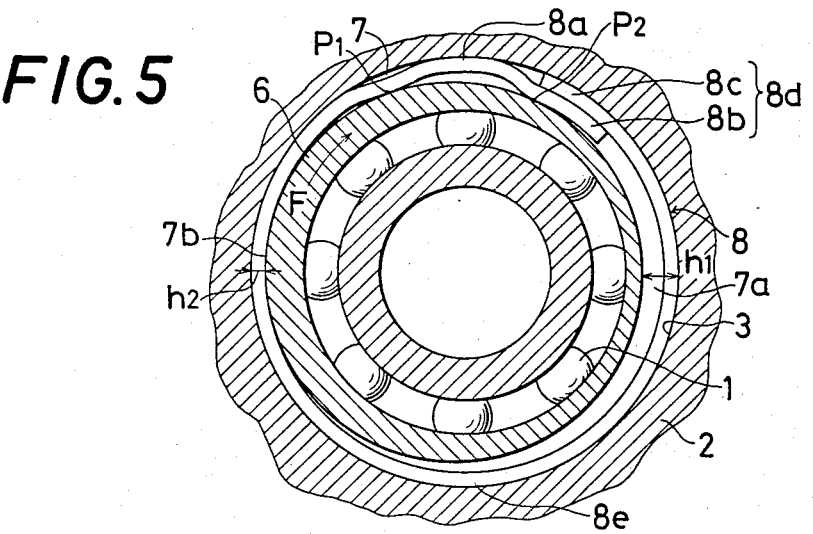
FIG. 5 is a front view in vertical section showing the device of FIG. 1 in an anticreeping state.

On the other hand, the resilient ring 8 is held in pressing contact with the outer ring 6 only at opposite ends P1 and P2 of the protruding portion 8a, so that the resilient ring 8 tends to creep relative to the outer ring 6. Accordingly, when a creeping force acts in the direction of arrow F in FIG. 5, the outer ring 6 first tends to creep relative to the resilient ring 8 which is rigidly joined to the housing 2. With this movement, however, the shallow groove portion 7b of the circumferential groove 7 approaches the protruding portion 8a or the lapping joint 8d of the resilient ring 8, with the result that the protruding portion 8a or the joint 8d is forced toward the shallow groove portion 7b like a wedge relative thereto as shown in FIG. 5. As the outer ring 6 creeps, therefore, the wedging movement produces an enhanced anticreep action, stopping the creep in an early stage.

Although the embodiment described is adapted to prevent the creep of the outer ring 6 of the antifriction bearing 5 relative to the housing 2 supporting the outer ring 6, the inner ring 9 of the bearing 5 can be similarly prevented from creeping relative to the shaft supporting the inner ring 9. In this case, a circumferential groove is formed in the inner periphery of the inner ring 9, and a cut resilient ring is fitted in the groove with a protruding portion thereof projecting toward the shaft inserted through the inner ring 9.

Figure 6:
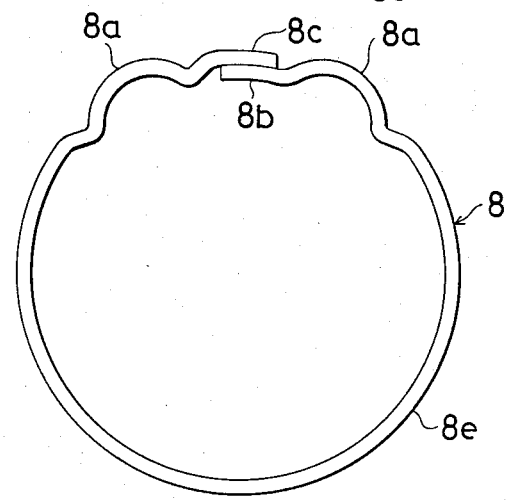
FIGS. 6 and 7 are front views showing modified resilient rings for the device of the invention.

Although the resilient ring 8 described has one protruding portion 8a on its circumference, the protruding portion 8a may be formed on each of circumferentially opposite sides of the joint of end portions 8b and 8c as seen in FIG. 6. When the protruding portions 8a are thus provided beside the end portions 8b and 8c immediately adjacent thereto, the lapping joint of the end portions 8b and 8c can be prevented from being displaced circumferentially by the elastic deformation of the resilient ring 8 when the ring is installed on an annular member. The lapping joint then need not be provided with any special means for preventing the displacement.

Figure 7:
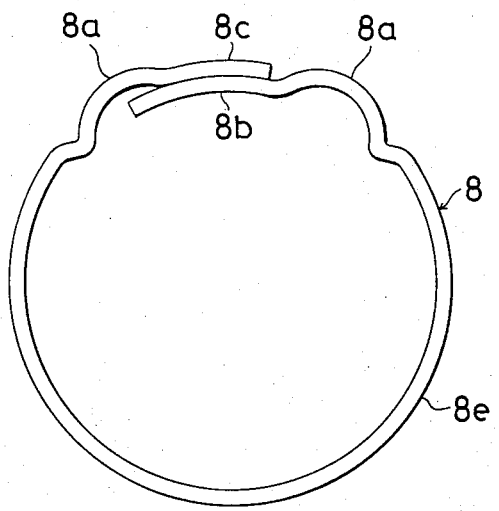

Further as shown in FIG. 7, the lapping ring end portions 8b and 8c may be made different in circumferential length, such that the inner end portion 8b is larger than the outer end portion 8c in circumferential length. Whereas an annular member having the resilient ring 8 fitted in its circumferential groove will not be fittable to a housing or shaft if the end portions 8b and 8c are fitted together in a reverse lapping relation, this embodiment eliminates such objection.

The cross sectional shape of the resilient ring 8, the shape, number and position of protruding portions 8a, and other details are not limited to the foregoing embodiments wherein the ring is rectangular in cross section. The ring can be modified variously; for example, it can be circular, square or polygonal in cross section.

The annular member for which the resilient ring is used is not limited to bearings but can be some other annular member which is adapted to fit in or around a support member. The annular member can then be prevented from creeping relative to the support member similarly effectively. In this case, the circumferential groove is of course formed in the desired position.

Briefly, the present invention provides an anticreep device comprising an annular member (outer ring) fittable to a support member and having a circumferential groove 7 formed in its periphery (outer periphery) eccentrically thereof and including a deep groove portion 7a and a shallow groove portion 7b, and a resilient ring 8 fitted in the groove 7 and having a protruding portion 8a of a height of projection projectable from the deep groove portion 7a and opposite end portions 8b, 8c fitted together depthwise of the groove 7 to provide a lapping joint 8d, the joint 8d having a combined thickness larger than the depth of the shallow groove portion 7b, the protruding portion 8a and the lapping joint 8d being fitted in the groove 7 at a portion other than the neighborhood of the shallow groove portion 7b. Accordingly the device has the following advantages.

(A) The device has high anticreep ability and is very simple to install without necessitating any special machining procedure for the support member (housing or shaft) for the annular member.

(B) The circumferential groove 7 needs to be formed only in the peripheral surface of the annular member to be fitted to the support member and can be formed without limitations on machining, while the annular member is not particularly limited in dimensions. The invention is easily applicable to usual standard bearings.

(C) The device is simple in construction and therefore low in cost.

Figure 10:
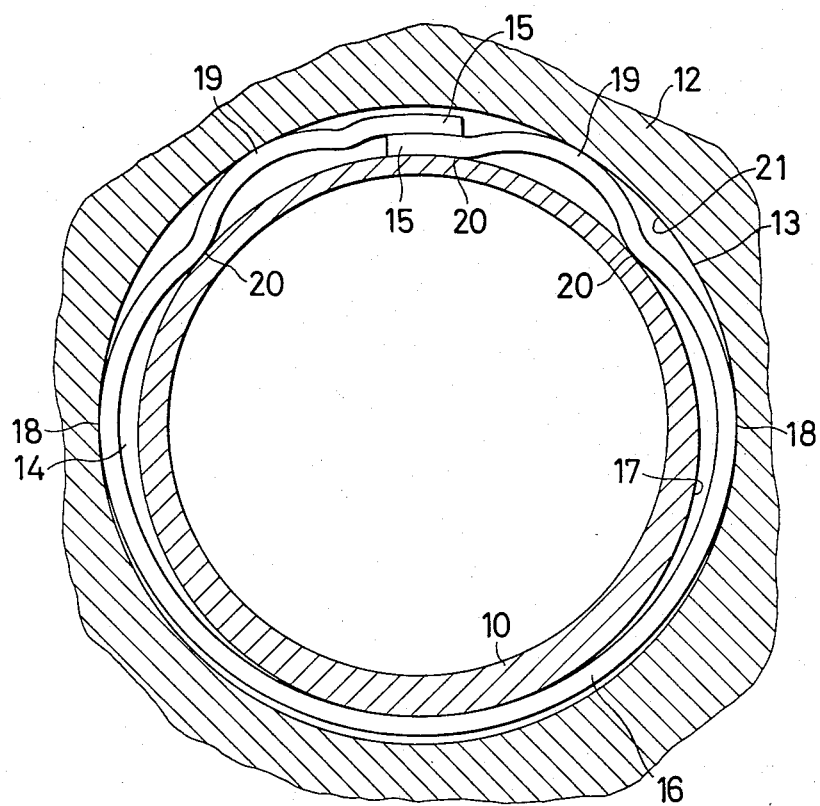
FIG. 10 is a front view in vertical section showing the device as fitted in a support housing.

FIGS. 8 to 10 show a modified embodiment of the invention.

Also according to this embodiment, an outer ring 10 has an outer periphery 13 fittable in a housing 12 and formed with a circumferential groove 14 as will be described below. A resilient metal ring 16 fitted in the groove 14 has an overall length longer than the entire circumferential length of the groove 14 and a radial thickness t. The ring 16 has opposite ends 15 lapping over each other within the groove 14 longitudinally thereof. The groove 14 is formed eccentrically of the ring 10, has a groove bottom surface 17 and includes a shallow groove portion having a depth h2 which is larger than the thickness t of the ring 16 and which is smaller than the combined radial thickness 2t of the end portions 15 of the ring 16. The groove 14 further includes a deep groove portion having a depth h1 which is larger than the combined radial thickness 2t of the end portions 15. The resilient ring 16 is elliptical and has an outside minor diameter smaller than the outside diameter of the outer ring 10. The ring 16 has at least one bulging portion 19 positioned away from the major diameter portions 18 thereof and curved to project radially outward by an amount $\delta_0$ larger than the depth h1 of the deep groove portion of the circumferential groove 14.

With the present embodiment, the inside minor diameter L1 of the resilient ring 16 is made equal to or slightly smaller than the diameter Do of the groove bottom surface 17 of the groove 14, so that when the resilient ring 16 is fitted in the groove 14, the inner surfaces of the minor diameter portions are in intimate contact with or in resilient pressing contact with the groove bottom surface 17. Further the inside major diameter L2 (between the major diameter portions 18) of the ring 16 is made not larger than the diameter D of the outer ring 10, whereby the ring is made easy to handle when the device is assembled as will be stated later. Although FIG. 8 shows the bulging portion 19 formed at each of circumferentially opposite sides of the lapping joint of end portions 15, only the bulging portion 19 on the right-hand side of FIG. 8 may be provided. When the bulging portions 19 are provided beside the end portions 15 immediately adjacent thereto, the lapping end portions 15 can be prevented from being displaced circumferentially by the elastic deformation of the resilient ring 16 when the device is assembled as will be described later. The lapping end joint then need not be provided with any special means for preventing the displacement.

The circumferential groove 14 has a width W which is made slightly larger than the axial dimension of the ring 16 to render the ring 16 easily fittable in the groove 14. The center of the bottom surface 17 of the groove 14 is positioned at a distance of (h1−h2)/2 from the center of the fitting peripheral surface of the outer ring 10, whereby the groove 14 is made easy to form. To assure the lapping of one end of the ring 16 over the other end thereof, it is preferable to prepare the resilient ring 16 from a resilient strip which is rectangular in cross section as illustrated.

The resilient ring 16 is fitted into the groove 14 of the outer ring 10, with the lapping end portions 15 of the resilient ring 16 located at a position (approximately at the deepest portion of the groove 14) where the lapping joint does not project outward beyond the outer periphery 13 of the outer ring 10, and the outer ring 10 is fitted into a bore 21 of the housing 12 while the bulging portions 19 outwardly projecting from the groove 14 are being elastically deformed and pushed radially inward from the outer periphery 13.

When the device is thus installed in place, the bulging portions 19 are rigidly held in pressing contact with the inner periphery 21 of the housing 12 with an interference $\delta$, while opposite ends 20 of the bulging portions 19 are resiliently and tightly pressed against the bottom surface 17 of the circumferential groove 14. Since the bulging portions 19 are positioned away from the major diameter portions 18 of the elliptical ring 16, the elastic deformation of the bulging portions 19 gives the major diameter portions 18 a tendency to bulge further radially outward. Consequently the outer surfaces of the major diameter portions 18 are resiliently and strongly pressed against the inner periphery 21 of the housing 21 over a very wide area as shown in FIG. 10.

According to the present invention, the resilient ring 16 is thus held in pressing contact with the inner periphery 21 of the housing under a high resilient force over a very wide area, with the result that the frictional force acting on the housing 12 is comparable to the force that would act when the resilient ring 16 is completely tightly joined to the housing. Accordingly even if the bearing is subjected to any vibration or varying loads, the resilient ring is unlikely to creep circumferentially relative to the housing. This eliminates abrasion between the housing inner periphery and the resilient ring.

At some time, the outer ring is likely to creep slightly relative to the resilient ring, with the lapping joint of opposite end portions 15 of the ring 16 positioned in the vicinity of the deepest portion of the groove 14. Nevertheless, the end portions 15 are lapped over each other circumferentially of the bearing to form the joint of a radial thickness 2t which is larger than the depth h2 of the shallow groove portion of the groove 14, so that if the outer ring is displaced in the direction of rotation relative to the resilient ring 16, the lapping joint is pushed radially outward by the bottom surface of the groove 14 to bite into the inner periphery of the housing as a wedge. The wedging action becomes more pronounced when the displacement in the direction of rotation is greater. Accordingly after the outer ring is allowed to creep slightly initially when assembled in place, creep of the outer ring can be prevented completely.

As described above, the device of the present invention has exceedingly higher anticreep ability than conventional devices and can be installed in a housing with extreme ease without necessitating any special machining procedure for the housing or like support member, while the circumferential groove can be formed easily without any difficulty. The circumferentially groove can be formed in the outer ring of the bearing out of alignment with its race without entailing any problem in respect of strength or machining process, so that the bearing for which the present device is used can be of the usual standard type and need not be of special size for the provision of the circumferential groove. The device itself is inexpensive to make.

As already stated, the cross section of the resilient ring, the shape, number and position of bulging portions, and the position of the circumferential groove in the annular member are not limited to those of the foregoing embodiments but are variable as desired without departing from the spirit of the invention.

What is claimed is:

1. An anticreep device comprising an annular member fittable to a support member and having a circumferential groove formed in its outer periphery eccentrically thereof and including a deep groove portion and a shallow groove portion, and a resilient ring fittable in the circumferential groove and having a protruding portion of a height of projection projectable from the deep groove portion toward the support member and opposite end portions fittable one over the other within the circumferential groove at a position adjacent to the protruding portion to provide a combined thickness larger than the depth of the shallow groove portion, the protruding portion and the opposite end portion being fitted in the deep groove portion with the other portion of the resilient ring fitted in the shallow groove portion for the use of the device to prevent creep of the annular member.

2. An anticreep device as defined in claim 1 wherein the annular member is the outer ring of an antifriction bearing supportable by a housing.

3. An anticreep device as defined in claim 1 wherein the annular member is the inner ring of an antifriction bearing supportable by a shaft.

4. An anticreep device as defined in claim 1 wherein the protruding portion is formed on each of circumferentially opposite sides of the fittable end portions of the resilient ring.

5. An anticreep device as defined in claim 4 wherein the inside end portion of the fittable end portions of the resilient ring is larger than the outside end portion in circumferential length.

6. An anticreep device for an annular member, the annular member having a circumferential groove formed in its periphery to be fitted to a support member, the device comprising a resilient ring having an overall length larger than the entire circumferential length of the groove and fittable in the groove with its opposite end portions lapped over each other within the groove, the circumferential groove being formed eccentrically of the periphery and having a groove bottom surface to provide a shallow groove portion having a depth larger than the radial thickness of the resilient ring and smaller than the combined radial dimension of the lapped opposite end portions, the groove bottom surface further providing a deep groove portion having a depth larger than the combined radial dimension of the end portions of the ring, the resilient ring being elliptical and having an outside minor diameter smaller than the outside diameter of the annular member, the resilient ring having at least one bulging portion positioned away from the major diameter portions thereof and being curved to project radially outward by an amount larger than the depth of the deep groove portion of the groove.

7. An anticreep device as defined in claim 6 wherein the bulging portion is formed on each of circumferentially opposite sides of the lapped end portions of the resilient ring.

8. An anticreep device as defined in claim 6 wherein the annular member is the outer ring of an antifriction bearing supportable by a housing.

* * * * *